US007453803B1

(12) United States Patent
Bugenhagen

(10) Patent No.: US 7,453,803 B1
(45) Date of Patent: Nov. 18, 2008

(54) CONGESTION CONTROL FOR PACKET COMMUNICATIONS

(75) Inventor: Michael K. Bugenhagen, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 711 days.

(21) Appl. No.: 10/999,243

(22) Filed: Nov. 30, 2004

(51) Int. Cl.
*H04L 12/26* (2006.01)

(52) U.S. Cl. .................. 370/230; 370/384; 370/385; 370/401; 370/410

(58) Field of Classification Search ............. 370/392, 370/400, 401, 410, 464–469, 351–360, 373, 370/384, 385, 395.6, 522, 229–231, 230.1; 709/235, 239
See application file for complete search history.

(56) References Cited

U.S. PATENT DOCUMENTS

| 5,778,057 | A | * | 7/1998 | Atai ................... 379/221.08 |
| 5,878,224 | A | * | 3/1999 | Smith ................... 709/224 |
| 6,591,301 | B1 | * | 7/2003 | Li et al. ................... 709/229 |
| 6,680,952 | B1 | * | 1/2004 | Berg et al. ................... 370/467 |
| 6,907,462 | B1 | * | 6/2005 | Li et al. ................... 709/226 |
| 7,038,574 | B1 | * | 5/2006 | Schlesener et al. ...... 340/286.02 |
| 7,124,440 | B2 | * | 10/2006 | Poletto et al. ................... 726/23 |
| 7,274,684 | B2 | * | 9/2007 | Young et al. ................... 370/352 |
| 7,346,047 | B1 | * | 3/2008 | Berg et al. ................... 370/352 |
| 2004/0240389 | A1 | * | 12/2004 | Bessis et al. ................... 370/252 |
| 2007/0118894 | A1 | * | 5/2007 | Bhatia ................... 726/13 |
| 2007/0121502 | A1 | * | 5/2007 | Donovan et al. ............. 370/230 |
| 2007/0121515 | A1 | * | 5/2007 | Donovan et al. ............. 370/236 |

OTHER PUBLICATIONS

Floyd et al., Pushback Messages for Controlling Aggregates in the Network, IETF Expired Draft, Jul. 2001, from the website http://www.aciri.org/pushback/.*

* cited by examiner

*Primary Examiner*—Wing F. Chan
*Assistant Examiner*—Mark A. Mais

(57) ABSTRACT

A media gateway controller that includes an interface configured to receive a call request for a call from a communication device and transmit a control message for the call to the communication device. The media gateway controller also includes a processor configured to process the call request to determine an end point for the call, determine an end point state for the end point, and generate the control message indicating the end point state.

18 Claims, 5 Drawing Sheets

CONGESTION CONTROL FOR PACKET COMMUNICATIONS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to packet based communication technologies, and in particular, to congestion control for packet communications.

2. Description of the Prior Art

Advances in telecommunication technologies have pushed the telecommunication industry towards what is commonly referred to as convergence. An example of an important advance is packet based telephony, sometimes referred to as Voice over Internet Protocol (VoIP). VoIP carries voice communications in a similar format as common data services, such as e-mail. Thus, voice services, which were once provided over separate legacy networks, have now converged with data services.

Several drawbacks exist related to the provisioning of packet based telephony services when compared to the capabilities of legacy networks. In the past, legacy networks included multiple levels of control processes to prevent network failure in the event of extremely high calling events or periods of congestion. Similarly, the same control processes worked to prevent network failure in the case of severely degraded capacity in the signaling and bearer portions of the networks. Unfortunately, packet based telephony networks do not provide comparable capabilities to control potential network failure events.

In particular, packet based telephony networks lack call push-back capabilities. Call push-back is required when, for example, a mass calling event occurs. To prevent legacy switches and other network elements from overloading, incoming call requests are either ignored or denied, or the call processing pace is slowed down. In addition to lacking call push-back capabilities, legacy networks and packet based networks lack the capability to correlate control processes to adequately handle mass calling events.

SUMMARY OF THE INVENTION

An embodiment of the invention helps solve the above problems and other problems by providing methods and systems that control call processes based on the end point state of an end point in a call. The methods and systems ensure that control protocols, such as Session Initiation Protocol (SIP), do not overrun the capacity of network elements. An embodiment of the invention introduces the legacy approach of preventing network failover to media gateway controllers, also sometimes referred to as soft switches. The methods and systems make next generation communication networks able to withstand mass calling events, periods of congestion, and degraded capacity.

In an embodiment of the invention, a media gateway controller includes an interface configured to receive a call request for a call from a communication device and transmit a control message for the call to the communication device. The media gateway controller also includes a processor configured to process the call request to determine an end point for the call, determine an end point state for the end point, and generate the control message indicating the end point state.

In an embodiment of the invention, the interface is configured to receive status information from the end point and determine the end point state for the end point based on the status information.

In an embodiment of the invention, the control message indicates a push-back instruction.

In an embodiment of the invention, the communication device comprises a Session Initiation Protocol (SIP) enabled communication device.

In an embodiment of the invention, the media gateway controller comprises a Session Initiation Protocol (SIP) enabled media gateway controller.

In an embodiment of the invention, the end point comprises a media gateway.

In an embodiment of the invention, the media gateway interfaces between a legacy communication network and a packet communication network.

In an embodiment of the invention, the end point comprises a border controller.

In an embodiment of the invention, the border controller interfaces between a first packet communication network and a second packet communication network.

In an embodiment of the invention, the end point comprises a legacy switch.

BRIEF DESCRIPTION OF THE DRAWINGS

The same reference number represents the same element on all drawings.

DETAILED DESCRIPTION OF THE PREFERRED EMBODIMENT

FIGS. 1-5 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation

Figure 1:
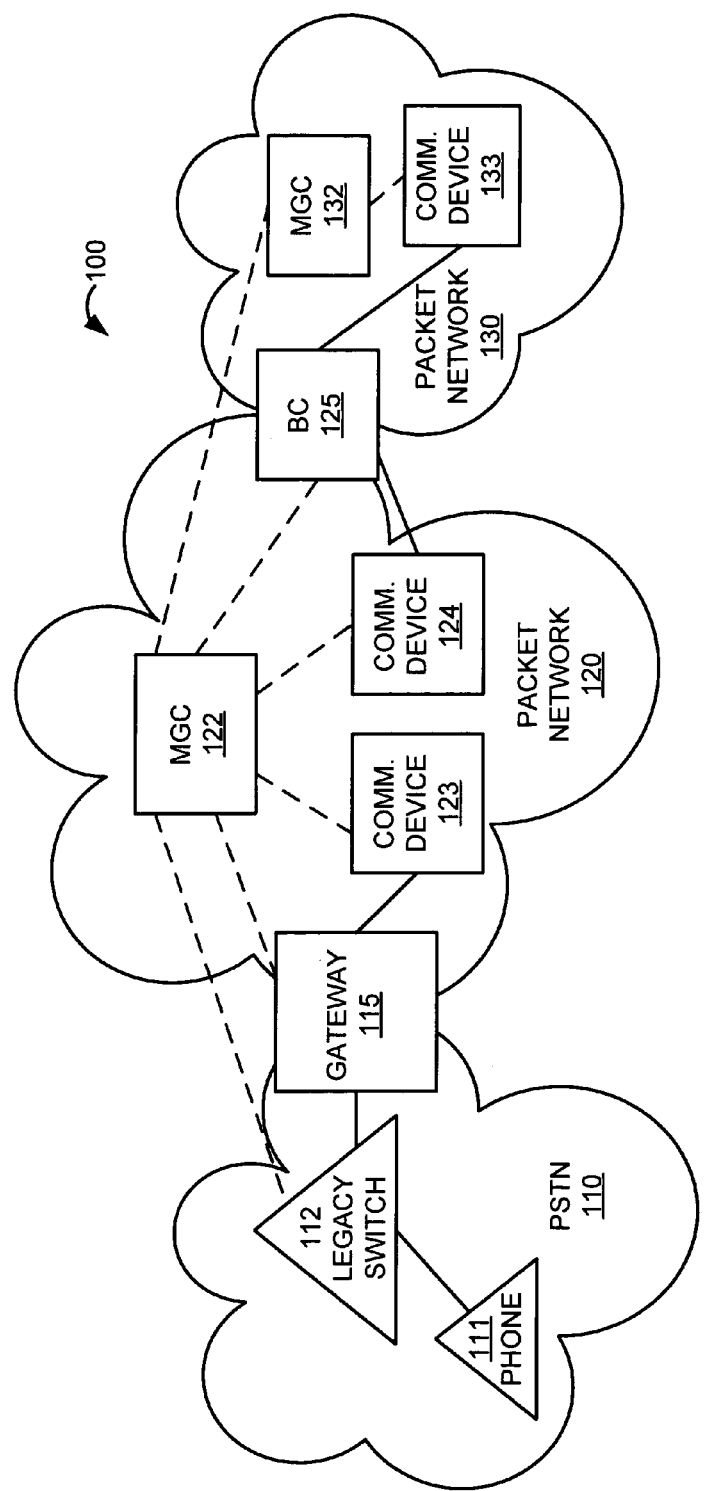
FIG. 1 illustrates a communication network in an embodiment of the invention.
Figure 2:
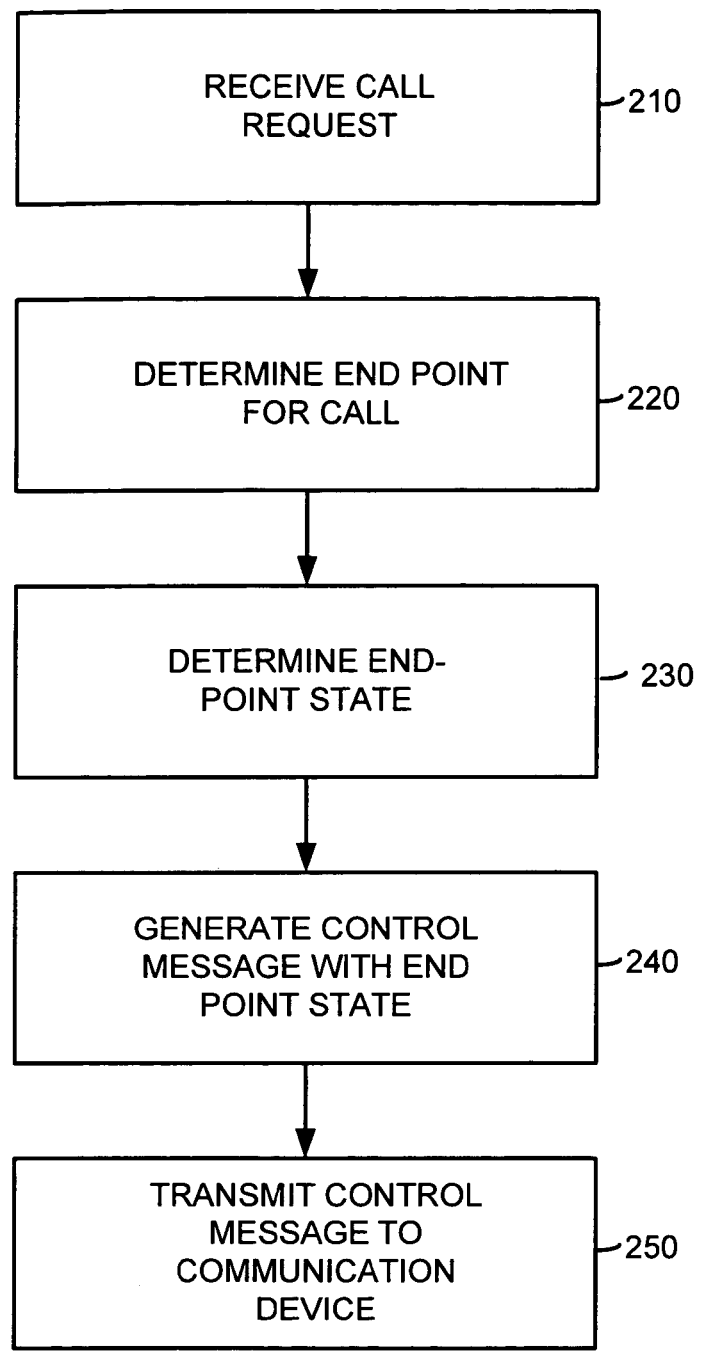
FIG. 2 illustrates the operation of a communication network in an embodiment of the invention.

FIGS. 1 and 2

FIG. 1 illustrates communication network 100 in an embodiment of the invention. Communication network includes packet network 120, packet network 130, and public switched telephone network (PSTN) 110. Gateway 115 couples PSTN 110 to packet network 120. Border controller 125 couples packet network 120 to packet network 130. Media gateway controller (MGC) 122 is in communication with gateway 115, communication device 123, communication device 124, and border controller 125. MGC is also in communication with legacy switch 112 and MGC 132. MGC 132 is in communication with communication device 133. Legacy switch 112 is in communication with telephone 111. Legacy networks are understood in the art to be non-packet based telephony networks, sometimes referred to as time division multiplexed (TDM) networks or circuit switched networks. Thus, legacy switch 112 could be referred to as a TDM or circuit switched style switch.

In operation, packet-based voice telephony services are provided by packet network 120 and 130. Packet network 120 could be operated by a first entity, and packet network 130 could be operated by another entity. And entity could be, for example, a telecommunications firm, a cable operator, a wireless communications operator or provider, as well as other types of entities. Border controller 125 interfaces between packet networks 120 and 130. Plain-old-telephony service (POTS) is provided by PSTN 110. Other services, such as data and video services, could be offered by packet networks 120 and 130.

MGC 122 is in communication with legacy switch 112 in accordance with a signaling protocol, such as Signaling System 7 (SS7). MGC 122 is in communication with gateway 115 in accordance with a protocol such as Telephony Routing over Internet Protocol (TRIP), TRIP-lite, H.248, as well as other media gateway control protocols. Communication devices 123 and 124 are in communication with MGC 122 in accordance with call control protocols, such as SIP, as well as other protocols. Similarly, communication device 133 is in communication with MGC 132 in accordance with call control protocols, such as SIP. MGC 122 and 132 are in communication with border controller 125 in accordance with signaling protocols such as SIP, as well as other protocols. MGC 122 and 133 are in communication together in accordance with SIP, as well as other protocols.

Packet communication network 120 provides packet-based voice telephony services, such as VoIP calling, to communication devices 123 and 124. Communication devices 123 and 123 are able to place and receive calls to other devices within packet network 120, as well as to and from devices in PSTN 110, packet network 130, as well as other networks. Calls from device 123 to telephone 111 are setup through gateway 115 and legacy switch (often times referred to as a circuit based switch) to telephone 111. Gateway 115 interworks the communications for the call from a packet format used in packet network 120 to a non-packet format used in PSTN 110.

Calls from either device 123 or 124 to device 133 are setup through border controller 125. Communications for the call may remain in a packet format. However, border controller 125 is often times required to modify portions of the communications, such as the destination or origin fields. Border controller 125 is in communication with MGCs 122 and 132 during call setup and call tear down. A call between device 133 and telephone 111 could be extended through border controller 125 and gateway 115 to legacy switch 112, and terminated at telephone 111. MGCs 122 and 132 would both participate in call control processes for the call, as well as would legacy switch 112.

FIG. 2 illustrates the operation of communication network 110 in an embodiment of the invention. Often times, a mass calling event occurs across communication network 110. For example, a national emergency could spark a mass calling event. Another example includes the surge in calling at holiday times, such as New Year's Eve. During mass calling events, the elements of communication network 110 have the capability to control the congestion caused by the mass calling events. Congestion could include a surge in call requests from communication devices, an increase in signaling messages between network elements, as well as an increase in user communications, such as voice, data and video communications.

As illustrated by FIG. 2, during a mass calling event, MGC 122 receives a call request for a call from a communication device (Step 210). The call request could be in the form of a SIP invite message. A SIP invite message would indicate the calling party as well as the called party. The parties could be identified by user names, such as user@domain.com, as well as by a phone number, such as 303-555-9999. MGC 122 processes the call request to determine an end point for the call (Step 220). The end point is a node in a network that will be traversed by the call. For example, an endpoint could be another soft switch, a border controller, a gateway, or a legacy switch, as well as other network elements. Next, MGC 122 determines the state of the end point for the call (Step 230). After determining the end point state, MGC 122 generates a control message indicating the end point state (Step 240), and transmits the control message for the call to the requesting communication device (Step 250).

MGC 122 determines the state of the end point for the call based on status information that is periodically sent to MGC 122 from the end point. For example, if the end point is another media gateway controller, the status information could indicate that the end point MGC is in a period of congestion. Similarly, the end point could be a legacy switch, a border controller, a media gateway, or a router. The end point could be SIP enabled. Thus, the end point and MGC 122 could exchange SIP messages. In one example, the control message could indicate a push-back instruction to the requesting communication device. In such an instance, the communication device could slow down the rate of its call request attempts in response to a push-back instruction. The requesting communication device could also be a SIP enabled device.

The above description illustrates the interaction of MGC 122 with a single end-point. However, MGC 122 could interact with multiple end-points. For example, MGC 122 could transfer push-back instructions to all the communication devices transmitting call requests. In such a manner, MGC 122 is able to throttle the amount of call requests across a network, thereby effectively handling periods of congestion.

Second Embodiment Configuration and Operation

FIGS. 3-5

Figure 3:
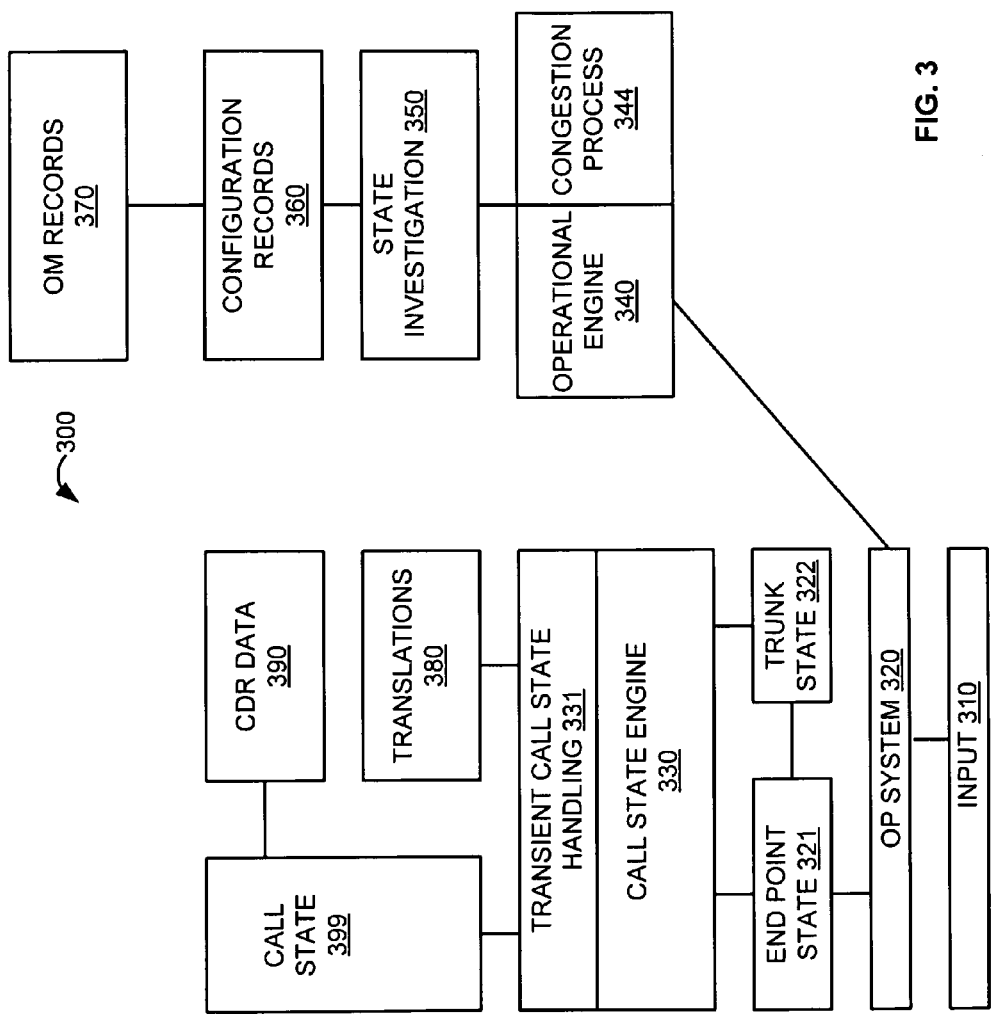
FIG. 3 illustrates call process in an embodiment of the invention.

FIG. 3 illustrates call control processes 300 of MGC 122 in an embodiment of the invention. Call control processes 300 includes an input process 310, operating system 320, end point state process 321, trunk state process 322, call state engine 330, operational engine 340, congestion process 344, state investigation process 350, configuration records process 360, OM records process 370, transient call state handling process 331, translations process 380, call detail record (CDR) data process 390, and call state process 399.

Input process 310 receives inputs to MGC 122, such as end point status information, ISDN User Part (ISUP) messages, TCAP/ANI message, operation commands, and operations and management system alarms and state feedback. Input process 310 passes inputs to operating system 320. Operating system 320 passes the inputs to end point state process 321 and trunk state process 322. Operation engine 340 interfaces between end point state process 321 and trunk state process 322 and congestion process 344. Operational engine also interfaces with state investigation process 350, configuration records process 360, and OM records process 370. Call state engine 330 interfaces between end point state process 321, trunk state process 322, and transient call state handling process 331. Transient call state handling process 331 interfaces to translations process 380 and call state process 399. Call state process 399 interfaces with CDR data process 390.

Figure 4:
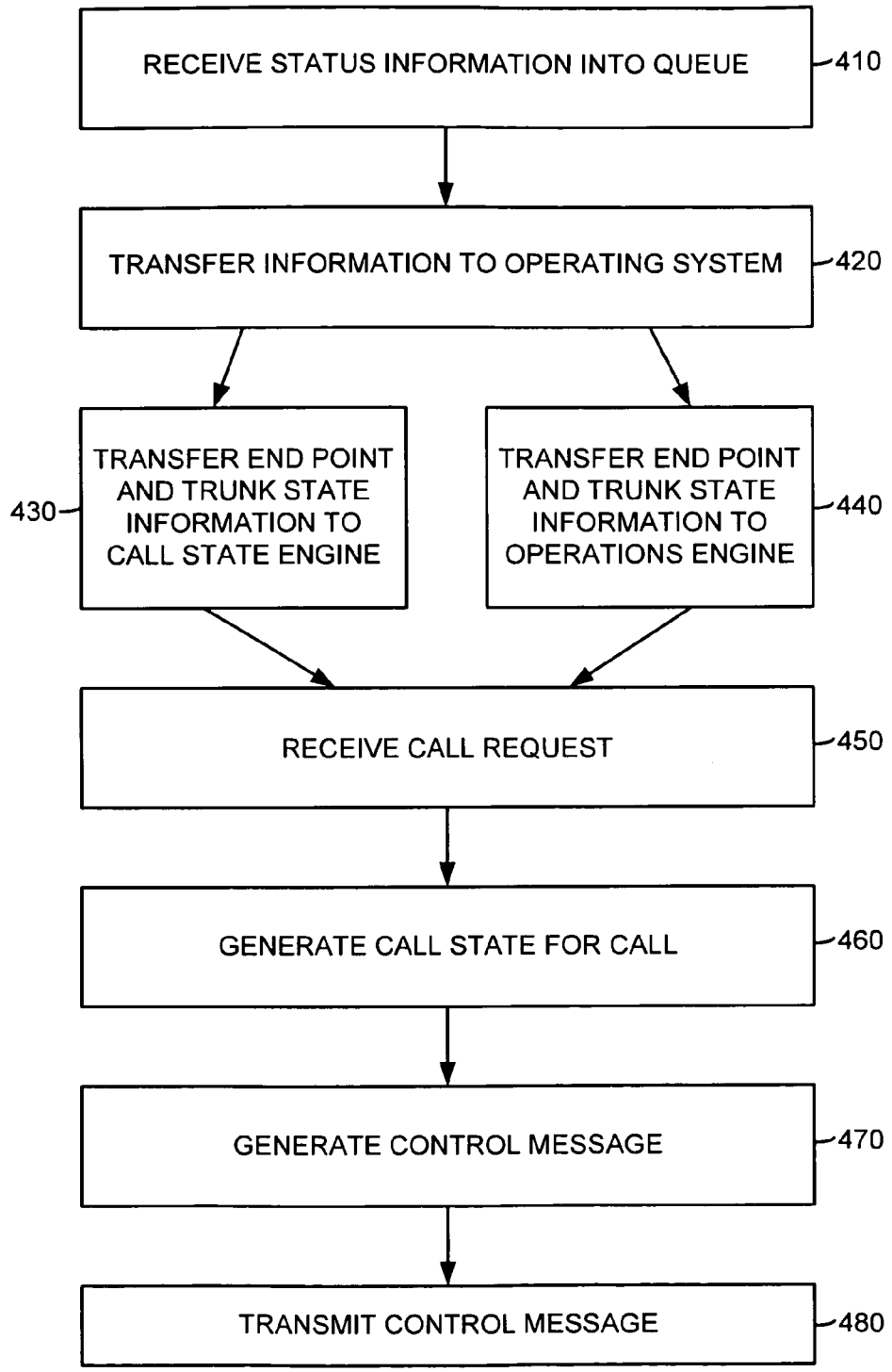
FIG. 4 illustrates the operation of a media gateway controller in an embodiment of the invention.

FIG. 4 illustrates the operation of MGC 122 in an embodiment of the invention, MGC 122 receives various status information into input process 310 (Step 410). Input process 310 places the status information into a queue. The status information could include end point information, such as centralized attendant services (CAS) or primary rate interface (PRI) information. CAS is a function of a usually centrally located attendant console that permits the control of multiple switches, some of which may be geographically remote. PRI is an integrated services digital network (ISDN) interface standard that is designated in North America as having a 23B+D channels, in which all circuit-switched B channels operate at 64 kb/s, and in which the D channel also operates at 64 kb/s. The PRI combination of channels results in a digital signal 1 (T1) interface at the network boundary. Input process 310 also receives status information such as SS7 signaling from other soft switches and legacy switches. Input process 310 also includes operations interfaces and receives operations and management system alarms and feedback status information.

Input process 310 passes status information to operating system 320 (Step 420). Depending upon the state of MGC 122, operating system 320 scans input process 310 for different types of status information. For example, if MGC 122 itself is in a state of congestion, it could elect to ignore some types of SS7 messages and process other types of SS7 messages. In a call congestion scenario, MGC 122 could elect to process status information from a media gateway related to the trunk state of the gateway while ignoring operations, management and administration part (OMAP) SS7 messages. Alternatively, MGC 122 could change the ratio of message types processed. For example, in regular processing periods, for every critical trunk state message received from a gateway MGC 122 might process one OMAP message. Then, during a period of congestion, MGC 122 could elect to process a higher ratio of trunk state messages to OMAP messages, thereby giving priority to trunk state messages over OMAP messages.

End point and trunk state information is passed from operating system to end point state process 321 and trunk state process 322. Call state engine 330 interfaces with end point state process 321 and trunk state process 322 to determine a call state (Step 430). Call state engine 330 processes the end point state information in the form of media gateway control protocols (MGCP), such as H.248, H.323, and SIP, as well as other protocols. Call state engine 330 processes trunk state information in the form of SS7 signaling, as well as other protocols.

End point state information and trunk state information is also passed to operational engine 340 (Step 440). Operational engine 340 combines the end point and trunk state information with other inputs such as operations and management information. Operational engine also includes congestion control process 344. Congestion control process 344 observes the link utilization, CPU occupancy, queue length, protocol congestion and resource occupancy of gateways, border controllers, legacy switches and other soft switches. Congestion control process 344 then determines whether load shedding, call throttling, or message prioritization is required.

At any point in the process, MGC 122 could receive a call request from a communication device. Upon receiving a call request (Step 450), MGC 122 determines the end point for the call. The end point for the call is passed to call state engine 330. Call state engine 330 accesses end point state process 321 and trunk state process 322 to determine the state of the end point. Then, call state engine 330 generates a call state for the call (Step 460). For example, if the end point is in a period of congestion, the call state for the call could be a hold. In such a case, a control message is generated in response to the call request (Step 470). The control message indicates the call request is on hold due to the congestion of the end point. MGC 122 transfers the control message to the requesting communication device (Step 480). In response to the control message, the communication device slows the rate at which it transmits call requests.

Advantageously, slowing the rate at which communication devices transmit call requests prevents congestion of failure at one network element from cascading to other network elements. For instance, if a particular media gateway is experiencing congestion, call requests made to a MGC that require routing through the congested gateway would be repeated by the communication device until the call request is granted. A typical SIP enabled mobile phone, for example, could bombard an MGC with call requests. In the aggregate, if the congested gateway is a crucial node in a network, then the MGC could easily become congested from the bombardment of call requests from repeating devices. Thus, the congestion of the gateway cascades to the MGC. By throttling the rate at which communication devices transmit call requests, the congestion of the gateway is localized and does not spread in a cascading fashion.

Figure 5:
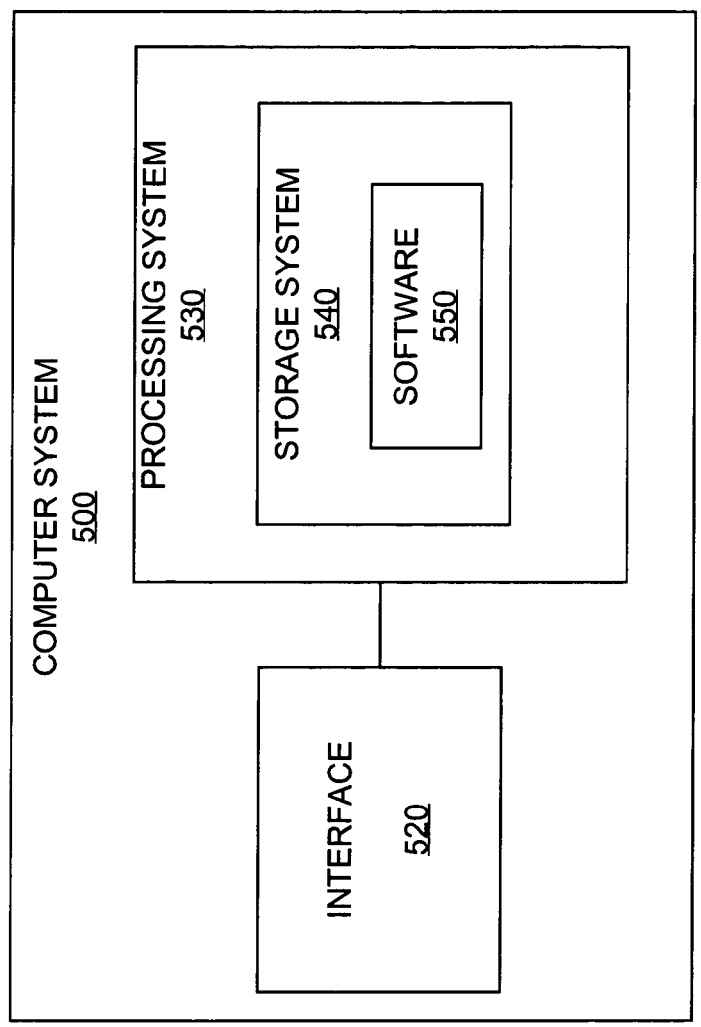
FIG. 5 illustrates a computer system in an embodiment of the invention.

FIG. 5 illustrates computer system 500 in an embodiment of the invention. Computer system 500 includes interface 520, processing system 530, storage system 540, and software 550. Storage system 540 stores software 550. Processing system 530 is linked to interface 520. Computer system 500 could be comprised of a programmed general-purpose computer, although those skilled in the art will appreciate that programmable or special purpose circuitry and equipment may be used. Computer system 500 may use a client server architecture where operations are distributed among a server system and client devices that together comprise elements 520-550.

Interface 520 could comprise a network interface card, modem, port, or some other communication device. Signaling interface 520 may be distributed among multiple communication devices. Interface 530 could comprise a computer microprocessor, logic circuit, or some other processing device. Processing system 530 may be distributed among multiple processing devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a general-purpose computer. Software 550 could also comprise an application program, firmware, or some other form of machine-readable processing instructions. When executed by the processing system 530, software 550 directs processing system 530 to operate as described for MGC 122.

What is claimed is:

1. A method of operating a media gateway controller, the method comprising:
   receiving a plurality of call requests for a call transmitted from a communication device at a transmission rate;
   processing at least one of the plurality of call requests to determine an end point for the call;
   determining an end point state for the end point; and
   transmitting a control message for the call to the communication device indicating the end point state wherein the control message indicates a push-back instruction instructing the communication device to reduce the transmission rate at which the communication device transmits the plurality of call requests.

2. The method of claim 1 further comprising receiving status information from the end point and determining the end point state for the end point based on the status information.

3. The method of claim 1 wherein the communication device comprises a Session Initiation Protocol (SIP) enabled communication device.

4. The method of claim 1 wherein the media gateway controller comprises a Session Initiation Protocol (SIP) enabled media gateway controller.

5. The method of claim 1 wherein the end point comprises a media gateway.

6. The method of claim 5 wherein the media gateway interfaces between a legacy communication network and a packet communication network.

7. The method of claim 1 wherein the end point comprises a border controller.

8. The method of claim 7 wherein the border controller interfaces between a first packet communication network and a second packet communication network.

9. The method of claim 1 wherein the end point comprises a legacy switch.

10. A media gateway controller comprising:
    an interface configured to receive a plurality of call requests for a call transmitted from a communication device at a transmission rate and transmit a control message for the call to the communication device; and
    a processor configured to process at least one of the plurality of call requests to determine an end point for the call, determine an end point state for the end point, and generate the control message indicating the end point state wherein the control message indicates a push-back instruction instructing the communication device to reduce the transmission rate at which the communication device transmits the plurality of call requests.

11. The media gateway controller of claim 10 further comprising the interface configured to receive status information from the end point and determine the end point state for the end point based on the status information.

12. The media gateway controller of claim 10 wherein the communication device comprises a Session Initiation Protocol (SIP) enabled communication device.

13. The media gateway controller of claim 10 wherein the media gateway controller comprises a Session Initiation Protocol (SIP) enabled media gateway controller.

14. The media gateway controller of claim 10 wherein the end point comprises a media gateway.

15. The media gateway controller of claim 14 wherein the media gateway interfaces between a legacy communication network and a packet communication network.

16. The media gateway controller of claim 10 wherein the end point comprises a border controller.

17. The media gateway controller of claim 16 wherein the border controller interfaces between a first packet communication network and a second packet communication network.

18. The media gateway controller of claim 10 wherein the end point comprises a legacy switch.

* * * * *